Sept. 15, 1970  R. H. SHULTZ ET AL  3,528,537
CONVEYOR BELT ALIGNMENT APPARATUS
FOR CANDY BARS AND THE LIKE
Filed Sept. 11, 1968  3 Sheets-Sheet 1
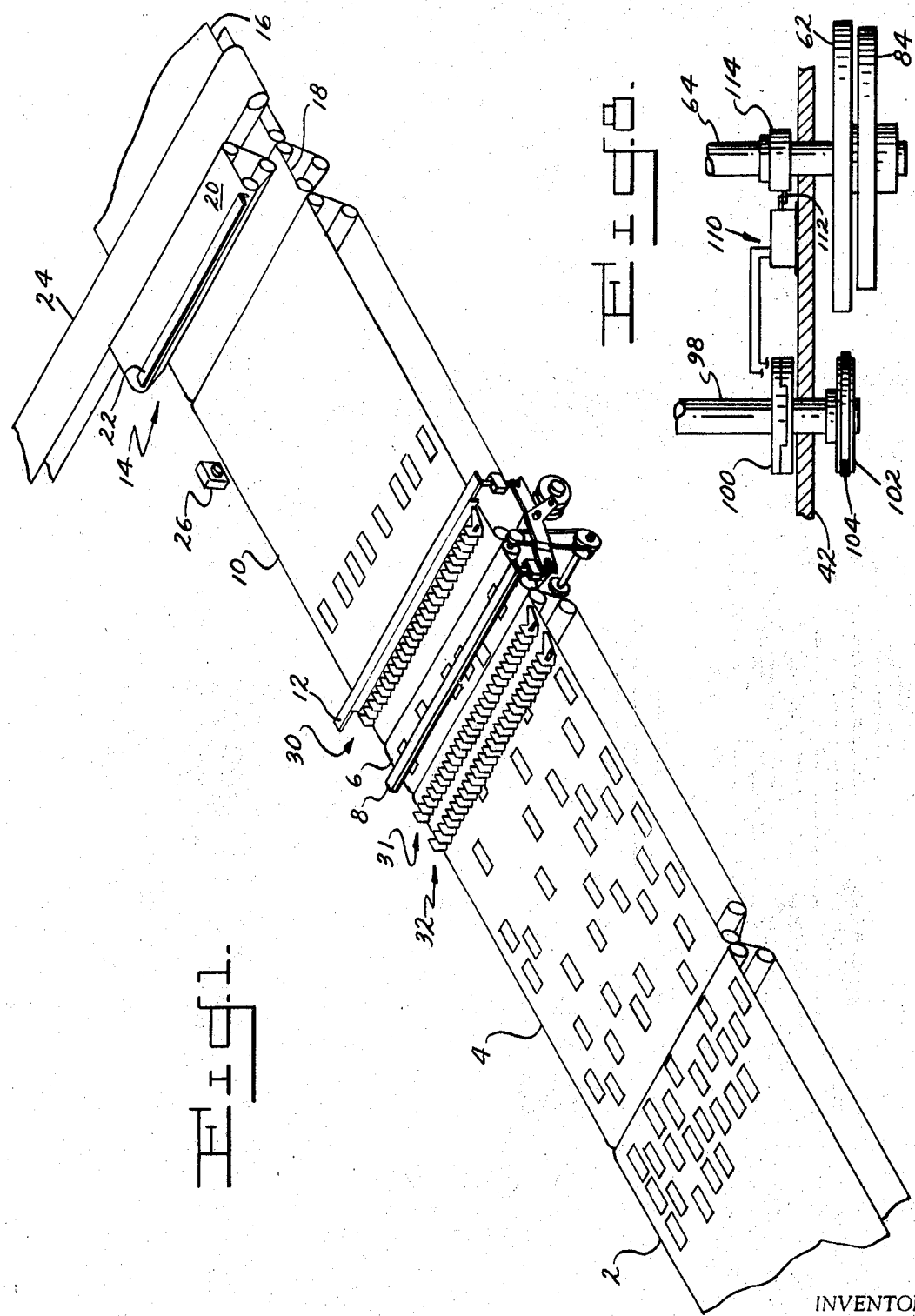
INVENTORS
RICHARD H. SHULTZ
RICHARD H. PROVOST
BY Chapin, Neal & Dempsey
attorneys

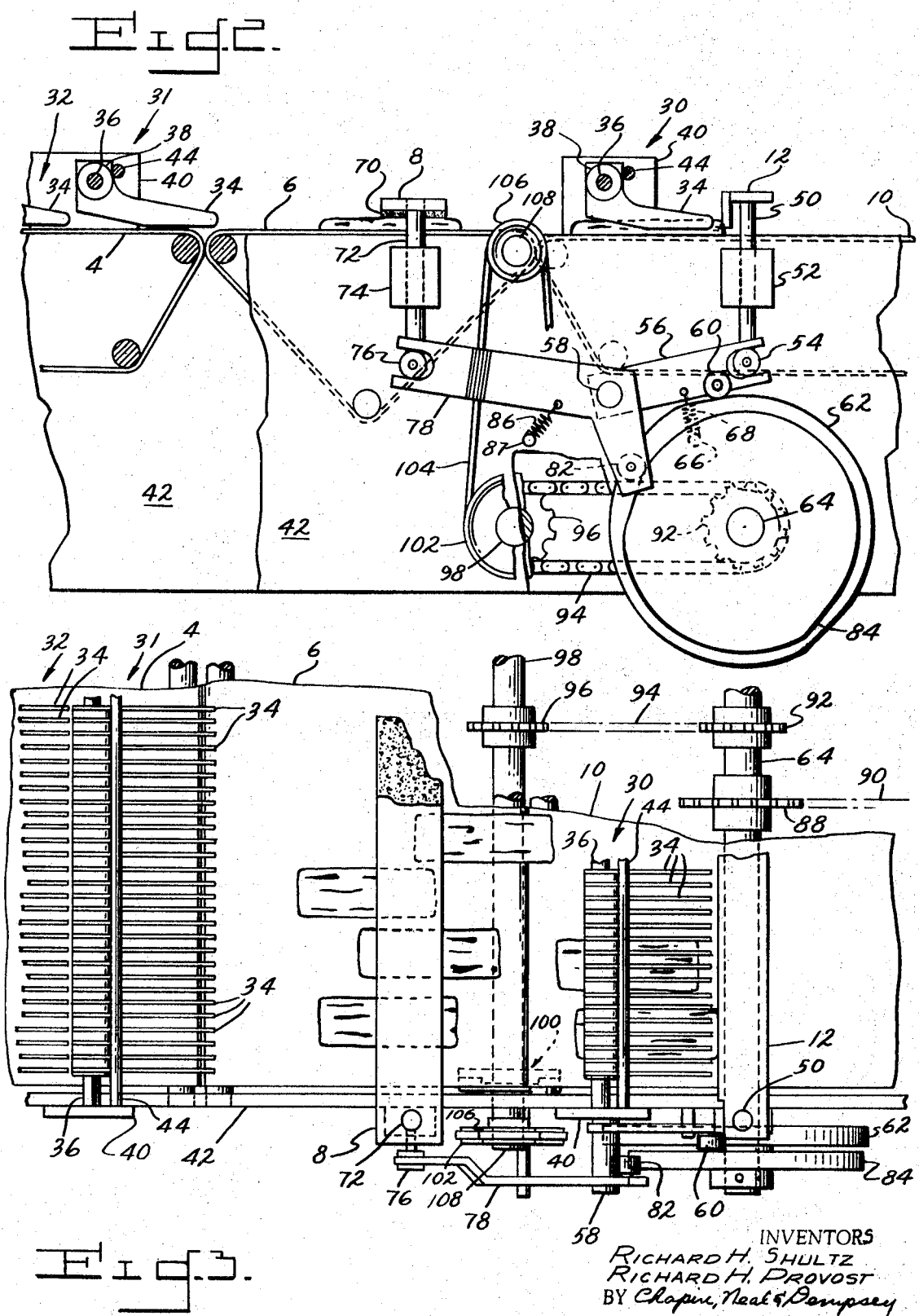

Sept. 15, 1970     R. H. SHULTZ ET AL     3,528,537
CONVEYOR BELT ALIGNMENT APPARATUS
FOR CANDY BARS AND THE LIKE
Filed Sept. 11, 1968     3 Sheets-Sheet 3
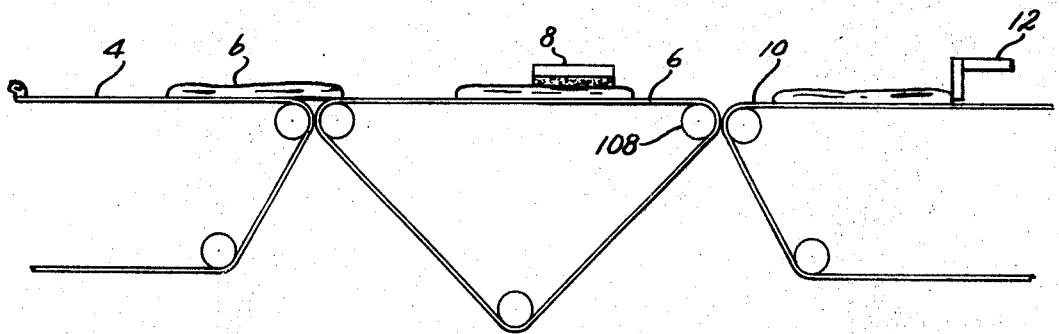
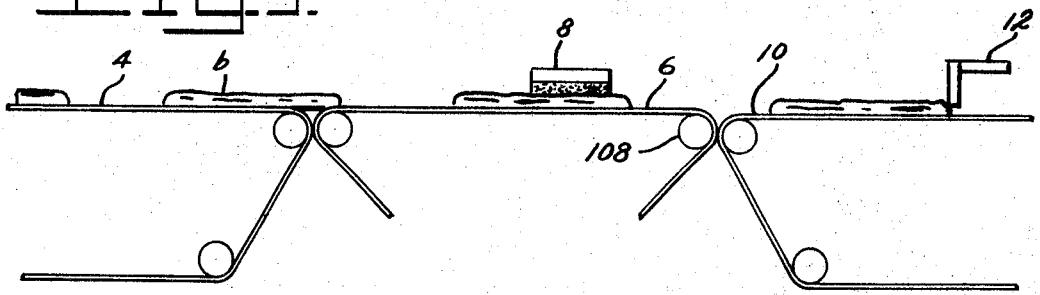
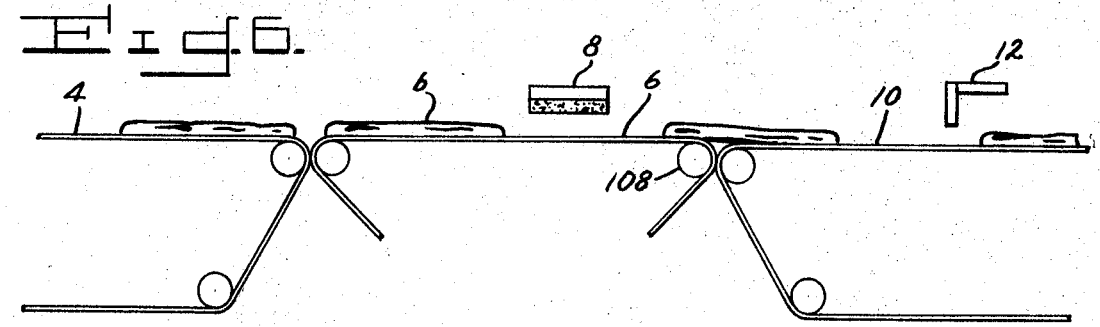
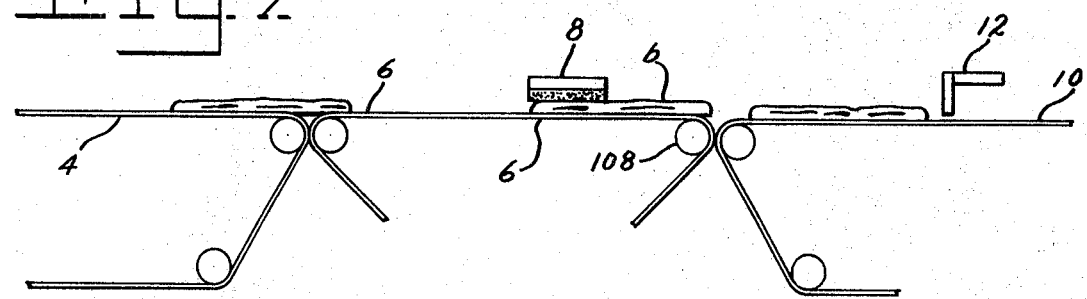
INVENTORS
RICHARD H. SHULTZ
RICHARD H. PROVOST
BY Chapin, Neal & Dempsey
Attorneys

United States Patent Office 3,528,537
Patented Sept. 15, 1970

3,528,537
CONVEYOR BELT ALIGNMENT APPARATUS FOR CANDY BARS AND THE LIKE
Richard H. Schultz, Longmeadow, and Richard H. Provost, Shrewsbury, Mass., assignors to Package Machinery Company, East Longmeadow, Mass., a corporation of Massachusetts
Filed Sept. 11, 1968, Ser. No. 758,975
Int. Cl. B65g 47/26
U.S. Cl. 198—34                     6 Claims

ABSTRACT OF THE DISCLOSURE

For a delivery belt conveyor system receiving candy bars and like articles for cross-wise transfer at a series of wrapping machine infeed stations, apparatus for aligning such articles in transverse rows under conditions where the articles are received in a random spaced relation transversely and longitudinally of the conveyor belt and comprising: continuously driven and longitudinally spaced first and second conveyor belt sections; an intermittently driven connecting belt therebetween; means to temporarily hold groups of articles on the connecting belt while the latter is at rest; gate means on the second belt section to align as a transverse row the articles of each group released by the holding means; and mechanism actuating the connecting belt, holding means, and gate aligning means in timed cycles of operation.

BACKGROUND

This invention relates to apparatus for arranging candy bars and like articles in transversely aligned and longitudinally spaced rows on a conveyor belt system as, for example, on the receiving belt section of conveyor transfer machinery for automatically delivering such articles to a plurality of wrapping machine infeed stations arranged laterally of the delivery belt path. In particular the invention relates to apparatus for grouping and aligning such articles in transverse rows when the articles are received in randomly and haphazardly arranged spaced positions longitudinally and transversely of the belt.

An automatic transfer conveyor system of the type in which the device of the present invention may be utilized is exemplified by pending application Ser. No. 654,164 filed July 18, 1967, now Pat. No. 3,429,416. The transfer system as disclosed therein receives candy bars from candy enrobing machinery in longitudinally spaced transverse rows on a flat conveyor belt, the bars of each row being in more or less staggered relation. A gate aligning mechanism is intermittently operated to bring the staggered bars of each such row into a transversely aligned relation and then to release the row for automatic distribution at any one of the series of transfer stations as needed.

As those familiar with various types of candy making machinery will readily appreciate, candy bars and the like in many installations may, however, be delivered in a random and haphazard fashion with respect to the longitudinal and lateral spacing thereof at the discharge end of an enrober cooling belt. In such cases where no longitudinal spacing of bars exists to define even poorly arranged groups or rows transversely of the belt, the bars must be brought into such a positionally grouped condition and aligned as longitudinally spaced rows in order to allow the proper handling thereof by an automatic transfer mechanism such as is exemplified by the above mentioned application.

The device of the present invention is designed to take a randomly arranged delivery of candy bars, gather the bars into individual groups, align the so grouped bars transversely across the belt, and then intermittently release the same as rows in evenly spaced relation for conveying to the automatic transfer mechanism at wrapper infeed stations. Insofar as is known, no automatic machinery exists for such grouping and transverse alignment of rows of candy bars and like articles on a flat conveyor belt system. A principal object of the invention, therefore, is to provide apparatus which will largely eliminate any manual handling whatsoever of randomly disposed candy bars in order to properly position the same for delivery into a conveyor transfer system of the general type requiring evenly spaced transverse rows as disclosed in the aforementioned application. Further objects are to provide an apparatus of simple and rugged construction and one which can be readily incorporated into existing article transfer structures having a flat delivery belt so as to enable the handling of articles when presented thereto in a randomly disposed positional relationship.

DRAWINGS

FIG. 1 is a schematic view of the entrance or receiving end section of a candy bar conveyor belt transfer system positioned to receive bars from the discharge end of a candy enrober cooling belt, and diagrammatically indicating at the far end the elements of one of a series of transfer stations for a wrapping machine, the apparatus of the present invention being shown at an intermediate position between the ends of the receiving belt section;

FIG. 2 is a side elevation of the new apparatus, showing exemplary mechanism for operation of the intermittently driven connector belt, the article grouping or holding member, and the gate aligning member of the device;

FIG. 3 is a plan view with portions cut away of the operating structure shown by FIG. 2;

FIGS. 4, 5, 6 and 7 are schematic views illustrating the action of the device at various stages in a cycle of operation; and FIG. 8 is a schematic plan view showing means for actuating an electric clutch for the intermittent drive of the connector belt.

Referring to FIG. 1 the discharge end of a candy enrober cooling belt is shown at 2, the position of the bars as delivered from the candy making machinery being indicated thereon. The bars are passed by belt 2 on to a first or entrance belt section 4 of the receiving conveyor belt portion of the conveyor transfer system. Belt section 4 is continuously driven. From belt 4 the bars are then passed on to a connecting belt 6 of the new apparatus. Belt 6 is intermittently driven and during each cycle of operation of the new device a number of bars are temporarily held as a group against further movement by a holding pad member 8. The group is then released by holder 8 and when released belt 6 is driven to pass the so grouped bars to a second or downstream belt section 10. Belt 10 is continuously driven and spaced from the end of belt 6 above belt 10 is an aligning gate member as at 12. Gate 12 is actuated in timed relation with holding member 8 and connecting belt 6 as will be later described in detail. The gate aligns the bars of each group and successively releases groups for delivery on belt 10 as longitudinally spaced and transversely aligned rows. In such positionally spaced relation the rows of bars may thus be transferred at any one of a series of transfer stations so as to supply bars as required to a laterally directed cross belt of an infeed mechanism for a wrapping machine.

One such transfer station is indicated generally by numeral 14 in FIG. 1. Here the principal components are diagrammatically illustrated and the operation thereof will be briefly described. At station 14 a row of bars can be received, if needed, for delivery to the wrapper infeed mechanism by a sensing element (not shown) which signals a depleted supply of bars at the station. If additional bars are not needed no signal will be generated and the row will then be conveyed to a second conveyor section at 16 (leading to succeeding transfer stations) by a lower belt 18 of an elevator device between belt 10 and belt 16. Belt 18 is continuously driven in the position shown between belts 10 and 16 and is mounted on suitable framework (not shown) of the elevator on which an intermittently driven upper belt 20 is also carried directly above belt 18.

In the event the sensing mechanism at the transfer station signals for an additional supply of bars, belt 20 is lowered by the elevator to a position between belts 10 and 16, receives a row of bars thereon, stops and is then lifted back to the elevated position indicated in FIG. 1. Belt 18 is thus again placed in condition to pass subsequent rows of bars onto belt 16. A pusher element indicated at 22 is mounted in an elevated position to engage bars on belt 20 when in its upper position. Pusher 22 operates to push bars from belt 20 on to a cross belt at 24 when the latter is empty and at rest. Cross belt 24 is run intermittently and advances bars (now in an inline position) in a laterally directed path to the infeed section of a wrapping machine.

At 26 a scanning device is positioned to sense the presence of a row of bars adjacent the discharge end of belt 10. In the event the transfer station mechanism at 14 is calling for additional bars at the time device 26 detects a row of bars at this location, the elevator mechanism is prevented from operating until a sufficient time has elapsed to allow the row to pass beyond belt 18. The elevator may then operate to drop belt 20 to its lower position, receive the next row of bars, and return to its upper position before a next succeeding row arrives at the end of belt 10. Thus scanner 26 insures operation of the elevator in a properly timed relation to the spacing of the rows so that each row is either picked up at a transfer station or is carried past it.

The details of the mechanism for operation of the various components at a transfer station 14 as briefly outlined above are disclosed in the aforementioned application Ser. No. 654,164. Reference is made to that disclosure for a detailed description of an apparatus and sequence of operations in signaling for and receiving the rows for advancing bars to the wrapper infeed. The sequence of operations as described in connection with the diagrammatic showing of FIG. 1 indicates the need to establish transversely aligned and longitudinally spaced rows of bars on the flat conveyor belt for supplying one or more transfer stations for the automatic pickup and advance at said stations to place the bars in an inline disposition on a laterally directed belt as the cross belt 22.

As above mentioned the new grouping and alignment apparatus comprises the intermittently driven belt 6 connecting the entrance and down stream conveyor belt sections 4 and 10, respectively, the holder pad member 8 positioned above belt 6, and the alignment gate 12 disposed above belt 10 in spaced downstream relation to belt 6. Means are provided for intermittently driving the belt 6, for moving the holder 8 to and from an overhead article engaging condition, and for moving gate 12 to and from an article obstructing relation. Actuating mechanism drives these elements in timed relation and in repeated cycles of operation. During each cycle, belt 6, on receiving a number of randomly spaced candy bars from the continuously driven belt 4, stops and holder 8 is concurrently lowered to engage the bars thereon. The bars thus held form a group gathered on belt 6 for the subsequent alignment by gate 12. Gate 12, during a holding or "grouping" action by the connecting belt and holder, is movable into an obstructing condition transversely of belt 10. In this gate condition the leading edges of a group of bars previously released by belt 6 are then brought into alignment against it. The dwell in the down position is timed to allow all bars of the group to abut the gate. The gate is then moved upwardly to free the now aligned row for passage under and beyond it on belt 10. Thus at the end of each cycle of operation an evenly aligned transverse row of bars is released for advance to the transfer stations. Operation of the device is furthermore timed to produce a longitudinally spaced relation between each row according to the spacing required for suitable operation as above described at the transfer station.

As will be apparent in grouping the bars and forming the rows, a transversely spaced condition and relationship of each bar generally parallel to the path of conveyor travel must be maintained on the various belts 4, 6 and 10. As received from enrober cooling belt 2, each candy bar is more or less initially so disposed. Any "maverick" bars can be manually removed from belt 2 with a minimum of supervision. It will be readily seen that when the bars are engaged against gate 12 or are stopped at the end of belt 4, when belt 6 is stationary, the bars are resting on the continuously moving belts 10 and 4 and thus subject to shifting movement. Accordingly, means are provided in advance of gate 12 and the end of belt 4 to maintain a transversely spaced and longitudinally aligned realtion. Otherwise the bars would tend to skew or "fish tail." As shown in the drawings a series of laterally aligned, closely spaced "floating" fingers are carried in overlying relation to the belts at these locations. One set of fingers is at 30 in adjacent relation to gate 12. A double set of fingers 31 and 32 lie above belt 4 adjacent the entrance end of belt 6. The upstream set of fingers 32 above belt 4 acts to prevent bars from shifting or "fish tailing" if by chance any bar should strike the rear end of a bar immediately ahead of it and stopped between the fingers at 31 when belt 6 is stationary. The normal longitudinal spacing of bars on belt 4 will be such as to avoid "bumping" in this area. However, when bars having an appreciable length are being handled there is some chance for one bar to catch up to and momentarily hit the trailing end of a preceding bar. Accordingly, a double set of fingers is preferably located at the end of belt 4.

As seen in FIGS. 2 and 3 each set of fingers at 30, 31, and 32 comprise a series of closely spaced transversely aligned L-shaped members at 34 freely pivotable on rods as at 36. Members 34 are separated by spacers, such as bosses 38 integrally formed on each of the pivotally hung portions of members 34. The rods 36 are suitably fixed at each end in bracket plates as at 40 extending upwardly of the conveyor belts 4 and 10 and suitably mounted at each side thereof on side frame members 42 constituting the supporting framework for the conveyor belts and supported at a suitable elevation by legs (not shown). Finger positioning rods 44 are also anchored at each end in bracket plates 40 upwardly and forwardly of the rods 36 to form stops in order to prevent the lower edges of the forwardly projecting members 34 from contacting and scuffing the underlying conveyor belt surfaces. It will readily be appreciated that as each candy bar enters the area of the fingers, the bars contact the underedges of certain fingers and cause an upward pivotal action of the same on the rods 36, these fingers riding on the top of the bars. The fingers immediately adjacent each side of a bar will remain in a "down" position and thus prevent any skewing or "fish tailing" shift of the bars while between the fingers. Thus the longitudinal alignment of bars parallel to the path of conveyor travel will be maintained at the gate area in the obstructing condition thereof and at the entrance end of belt 6 when the latter is stationary and the leading end portions of bars hold them against forward movement by a frictional engagement on belt 6.

Referring now particularly to FIGS. 2 and 3, frame members 42 support the belt rolls on which belts 4, 6 and 10 are supported, belts 4 and 10 being continuously driven by any suitable conventional drive connection (not shown). The operating mechanism for driving the intermittent belt and for the movement of the gate and holder is also supported on members 42 as will be described. In the drawings parts of the operating and support structure at one side of the new apparatus are shown, it being understood that in general the same structure is duplicated at the opposite side of the belts.

Gate 12 is in the form of an angle iron, one leg of which is vertically disposed to block candy bars in the lower position shown for alignment of each group of bars. At the underside of the horizontal leg at each end of the gate is a lifting rod as at 50 for vertically reciprocating the gate to and from the obstructing condition, the rod being mounted as in a guide block 52 suitably fixed at the outer side of frame members 42. At the lower end of each rod 50 below the block is a roller 54 engaged by the yoked end of a gate operating lever 56, the other end of the lever being pivoted on a cross shaft 58 extending between frame members 42 and extending outwardly thereof. Gate lever 56 carries a cam follower roll 60 in contact with the edge of a cam 62 fixed on cam shaft 64 also supported on frame members 42. A spring post at 66 is fixed to frame member 42 and at its outer end has a spring 68 extending between the post and lever 56 to insure engagement of follower 60 against cam 62.

Holder pad 8 is in the form of a bar having at its underside an article contacting pad portion formed of resilient material such as sponge rubber for cushioned holding pressure on the upper surfaces of the candy bars and to conform to any irregular top contour which is characteristic of many candy bars. At each end of the holder a lifter rod 72 is suitably fixed thereto and slidably mounted in a block 74 on side member 42 for vertical movement as in the case of the gate 12. At the lower end of rod 72 is a roller 76 engaged in the yoked end of an arm 78 of a bell crank lever which is also pivoted on shaft 58. A short arm 80 of this lever carries a cam follower roll 82 engaging the surface of a cam 84 also mounted on cam shaft 64. A spring 86 extends between arm 78 of the lever and a post 87 fixed to side frame member 42 for insuring the follower 82 engagement against cam 84.

As shown in FIG. 3 cam shaft 64 is provided with a drive sprocket 88 driven by a chain indicated at 90 for connection to a suitable power source for continuously driving shaft 64. Also fitted on shaft 64 is a sprocket at 92 with chain drive at 94 to sprocket 96 fixed on a clutch shaft at 98. Shaft 98 is supported by frame members 42 and is continuously driven by chain 94. Indicated at 100 is an electric clutch which may be energized to drive a pulley 102 on the end thereof outwardly of frame 42 for intermittently driving through a belt 104 a pulley 106 fixed to a drive roll shaft at 108 for the belt 6. As schematically illustrated in FIG. 8 the clutch 100 to intermittently drive belt 6 may be energized by a switch control indicated at 110. A switch trigger at 112 may be energized and deenergized to operate the clutch as by an eccentric cam 114 on the cam shaft 64. As will be described the signal for operation of belt 6 is synchronized in timed relation with the operation of the levers controlling movement of the gate and holder pad members.

In FIG. 2 the contour of the cams 62 and 84 indicates generally a means for an example of gate and holder pad operation in which the rise of cam 62 will lift gate 12 somewhat in advance of the lifting of the holder pad 8. Also the gate will again be lowered at somewhat less than at the halfway point in the clockwise rotation of the cams. The holder pad 8 will then be lowered shortly thereafter. It will be appreciated, of course, that belt 6 may be timed for driving and advancing bars on the belt as soon as the holder engagement is released, and to be rendered stationary when the holder returns to its lower engaging position.

From the above description it will be noted that the mechanism for operating the various parts of the device may be altered to accommodate and handle a range of different sizes of bars and that the conditions under which the bars are handled can be adjusted for properly handling the same in transversely aligning and spacing the rows of bars. Preferably the source of power for driving cam shaft 64 through chain 90 is a variable speed drive. Thus the speed of the shaft may be varied depending upon the relationship which the length of a particular candy bar bears to the length of the intermittently driven belt 6 and the spacing of the alignment gate 12 from the downstream end of belt 6 as well as the speed of belts 4 and 10. With these various factors in mind the cycle of operation will now be described with reference to FIGS. 4–7.

As seen by FIG. 4 the gate and holder pad at the start of an assumed cycle are both shown in down position with belt 6 stationary. It may also be assumed that a group of bars has previously moved from belt 6 to a position adjacent gate 12 and that all such bars already abut gate 12 or that any slightly lagging bars will do so prior to the gate lifting movement for passage of the bars thereunder. It will be noted that at this assumed starting position of the cycle the dwell of the gate and holder in their lower condition has been for a specified time period depending upon the length of the bars, the dwell time allowing the lagging bars of a group to abut against the gate.

In FIG. 5 a condition is shown wherein the gate 12 is commencing to rise and will shortly thereafter free the aligned bars to advance on the continuously moving belt 10 past the gate. At this time and consistent with the length of the bars and the distance from the holder position to the end of belt 6 and thence to gate 12, the holder pad may commence its upward movement immediately after the upward movement of the gate (as would be the case with the cams shown in FIG. 2). However, it will be appreciated that the operating mechanism may be designed to raise the holder pad prior to or simultaneously with the time at which the alignment gate releases a row of bars. The important factor in a given timed relationship of gate and holder pad action is the length of time a most forwardly advanced bar held by the pad will take to reach the gate position inasmuch as the leading bar of each group must be stopped by a lowered gate. In FIG. 5 the holder pad is shown in its lower holding position and the belt 6 thus remains stationary.

As the holder 8 is raised belt 6 is simultaneously driven through energizing clutch 100) or it may be driven at a later time in an upper position of the holder pad. The exact moment for starting the drive of belt 6 is dependent upon the above-mentioned bar length, spacing relationship, speed of travel, etc. Belt 6, when driven, first advances the group of bars previously engaged by holder 8 on to the continuously driven belt 10. Secondly, belt 6 receives from belt 4 a further group of randomly spaced bars for a succeeding "grouping" and holding action by the holder pad.

In FIG. 6 movement of bars from belt 6 and the receiving of bars from belt 4 is indicated, the group of aligned bars (as in FIG. 5) having passed beyond the gate, and the gate now being shown in the process of descending to its lowered position. Gate 12 may dwell at its upper position for a timed interval or only momentarily, the important factor at this stage being the time required to advance the trailing edges of an aligned row past gate 12. Again, this means that the gate may start down before, simultaneously with, or after the time belt 6 is operated.

In FIG. 7 the gate is shown again in its lowered position to align a succeeding group of bars released from belt 6. In FIG. 7 the holder pad 8 is also shown in its down position, the belt 6 again being stationary. The sequence in returning the holder pad to this position and the stopping of belt 6 is again governed by the relationships above mentioned, the belt 6 being stopped as the trailing bar of a group has been advanced to belt 10. The position of the parts in FIG. 7 as previously mentioned will be maintained until such time as all bars on belt 10 are in conditiion to be aligned against gate 12 as described with respect to FIG. 4.

It will be noted in considering FIGS. 4–7 and the alternatives suggested in describing the oepration of the device that the bars on the continuously driven belt 4 will be prevented from advancing on to belt 6 while the latter is stationary since a frictional engagement of the front end of a bar against the surface of the "dead" belt 6 will prevent its further advance. Such a condition may be seen in FIGS. 4, 5 and 7. It will further be noted that preferably the upper surface of belt 6 is at a slight elevation above that of the continuously running belt 10. When handling longer lengths of bars the leading edge of a bar held at its trailing edge by the holder pad 8 may overlie belt 10. The difference in elevation avoids a scuffing action under such conditions and prevents the premature escape of a candy bar if hold pad 8 had berely made contact with the trailing end of said candy bar.

In the operation of "grouping" the candy bars on belt 6 and aligning the rows at gate 12, it has been pointed out above that belts 4 and 10 are continuously driven. Preferably, the speed of these belts is the same and the speed of belt 6 when driven is approximately at the same rate. As will be appreciated from the disposition of bars on the enrober belt 2 as in FIG. 1 and the disposition of bars on the entrance belt section 4 in this figure, it will be noted that belts 4 and 10 are being driven at a faster rate. The rate of increased speed is selected in order to increase the longitudinal spacing between bars on belt 10. Thus the bars may be held for grouping and alignment action without the suceeding bars riding into one another in the area of the fingers in advance of belt 6.

What is claimed:

1. Apparatus for transversely alinging candy bars and like articles on a delivery belt conveyor system receiving such articles in random longitudinally and transversely spaced positions at the entrance end thereof, comprising, longitudinally spaced and continuously driven entrance and downstream conveyor belt sections, a connecting conveyor belt joining said sections and means for intermittently driving said connecting belt, an alignment gate and means to move the gate to and from article obstructing condition transversely of said downstream belt section beyond said connecting belt, an article holder disposed transversely above the connecting belt and means to move the holder to and from an overhead article engaging condition, and mechanism for actuating said intermittent driving means and said gate and holder moving means in timed relation and in repeated cycles of operation, and, during each cycle of operation.

moving said holder into and out of engaging condition with articles on the connecting belt to form a group thereof and then to release such group for passage in a downstream direction, rendering said belt drive means inactive during said article engaging condition and thereafter, when said holder is disengaged, driving said belt to convey said group of articles downstream and simultaneously therewith receive additional articles from said entrance belt section, and in timed relation to the cycle of operation of said holder and connecting belt drive moving said gate into and out of obstructing condition to block passage of all articles of a group released by said holder and align the same as a transverse row on said downstream belt section, and then to permit such aligned row to pass beyond the gate.

2. Apparatus as in claim 1, in which, means extending transversely across said entrance belt section at the exit end thereof and transversely across said downstream belt section in adjacent upstream relation to said gate are provided for maintaining transversely spaced positions of articles on said belt sections and a parallel relation thereof to the conveyor path of travel.

3. Apparatus as in claim 2, in which, said positioning means comprise a series of closely spaced elongated finger members mounted above said belt sections and directed parallel to the path of conveyor travel, said fingers being freely movable in a vertical direction on direct engagement with said articles and the fingers at each side of an article forming a barrier against lateral shifting movement thereof.

4. Apparatus as in claim 2, in which, said gate and holder are reciprocably moved in a vertical path by their respective moving means and said holder has an article engaging portion formed of resilient material.

5. Apparatus as in claim 2, in which, said gate moving means and holder moving means are mechanically operated for reciprocation thereof and said intermittent driving means for the connecting belt is operated in response to electric signaling means.

6. Apparatus as in claim 2, in which, said gate and said holder moving means operate in response to cam actuators, said intermittent belt driving means is controlled by a switch actuated clutch responsive to a switch actuator, and a single cam shaft operates said cam actuators, said belt driving means and said switch actuator.

References Cited

UNITED STATES PATENTS

| 1,904,613 | 4/1933 | Braren | 198—34 |
| 3,429,416 | 2/1969 | Provost et al. | 198—20 |

HUGO O. SCHULTZ, Primary Examiner

U.S. Cl. X.R.

198—30